Patented Jan. 3, 1950

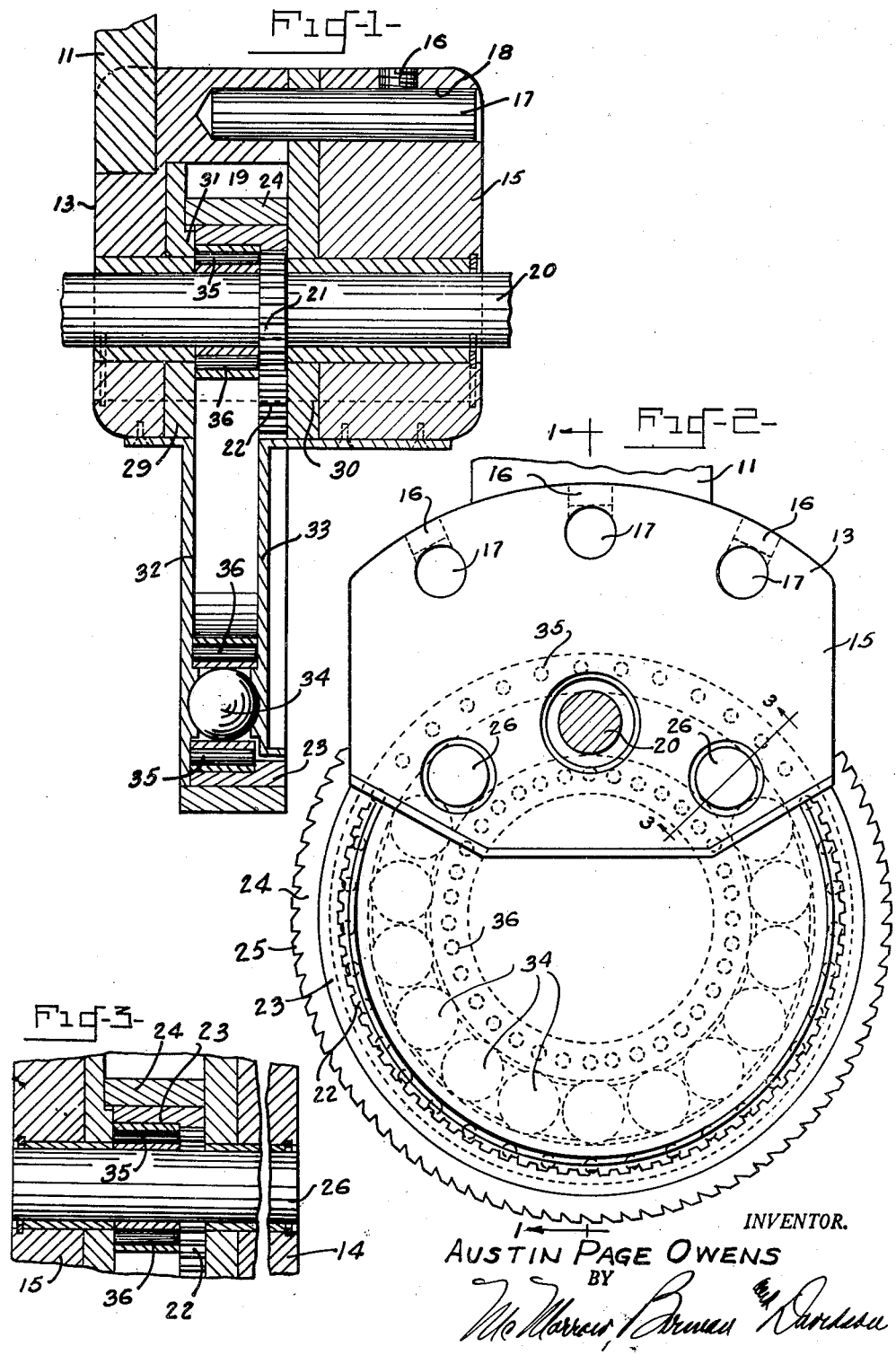

2,493,021

UNITED STATES PATENT OFFICE 2,493,021

SLOTTING ATTACHMENT FOR MACHINE TOOLS

Austin P. Owens, Highland Park, Mich.

Application April 19, 1946, Serial No. 663,468

2 Claims. (Cl. 90—11)

1

This invention relates to metal cutting machines, and more particularly to an attachment for metal cutting machines adapted to cut rectangular slots in a work piece.

A main object of the invention is to provide a novel and improved slotting attachment for metal cutting machines, said attachment being very simple in structure and very efficient in operation.

A further object of the invention is to provide an improved slotting attachment for metal cutting machines adapted to cut rectangular slots, said attachment being inexpensive to manufacture and providing rapid and clean-cut slotting action.

Further objects and advantages of the invention will become apparent from the following description and claims, and from the accompanying drawing, wherein:

Figure 1 is a vertical cross-sectional view of a slotting attachment structure constructed in accordance with the present invention taken on line 1—1 of Figure 2.

Figure 2 is an elevational view of the slotting attachment structure of Figure 1.

Figure 3 is a detail cross-sectional view taken on line 3—3 of Figure 2.

Referring to the drawing, 11 designates a bracket member adapted to be secured by any suitable means to a vertically depressible portion forming part of a conventional machine tool such as a drill press or the like. Secured to bracket member 11 is a housing 13 comprising a first section 14 and a second section 15, section 15 being detachably secured to section 14 by a plurality of set screws, 16, engaging stud members 17 rigidly carried by section 14 and passing through bores 18 formed in section 15 to receive said stud members. Section 14 is formed with a cavity 19 which is open at the bottom of said section.

Passing horizontally through sections 14 and 15 is a drive shaft 20 carrying a drive pinion 21. Pinion 21 meshes with internal gear teeth 22 formed on a vertical ring member 23 contained in cavity 19, said ring member having secured to its outer periphery a cutter ring 24 formed with cutting teeth 25. The main portion of the internal periphery of ring member 23 is smooth and is supported in cavity 19 on a pair of idler shafts 26, 26 extending parallel to shaft 20 through cavity 19. A wear plate 29 is provided in cavity 19 on one side of the ring assembly and a wear plate 30 is positioned between the sections 14 and 15 on the other side of the ring assembly.

2

As shown in Figure 1, cutter ring 24 is slightly greater in width than ring member 23 and wear plate 29 is formed with an arcuate shoulder 31 underlying the laterally extending portion of cutter ring 24. A depending bracket member 32 is secured to the bottom of section 14, and is formed to be received adjacent ring member 23 within the cutter ring 24. A second depending bracket member 33 is secured to section 15 and is formed to be received within the ring member 23 opposite to bracket member 32. Bracket members 32 and 33 are formed with opposing ball raceways receiving ball members 34, the top ball members abutting the respective idler shafts 26, 26. Engaging the ball members 34 is an outer ring bearing 35 and an inner ring bearing 36. Ring bearings 35 and 36 are also in anti-friction contacting relationship with idler shafts 26, 26 and with drive shaft 20, as shown in Figure 1, thus serving to transmit upward thrust from the cutting ring 24 through the ball members 34 to idler shafts 26, 26 and drive shaft 20 during the slotting operation.

As shown in Figure 2, the center of the cutter ring 24 is well below the bottom surface of the housing 13, thus enabling square cornered slots to be cut in work pieces of substantial thickness.

Drive shaft 20 may be driven by any suitable torque means, such as an electric motor or the like. Where the driving shaft is on a vertical axis, as in the case of a drill press, shaft 20 may be coupled to the drive shaft by suitable bevel gears. In operation, the cutter ring 24 cuts a channel or groove as it is lowered onto the surface of the work piece, and as it is further moved downwardly, cuts a rectangular slot in said piece. Due to the location of the center of the cutter ring below the bottom surface of housing 13, the cutter ring may be moved downwardly until its center is below the bottom surface of the work piece, whereby the slot corners are square and clean-cut.

While a specific embodiment of a slotting attachment for metal cutting tools has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. In a slotting tool comprising a support adapted to be located or moved above a work piece, a drive shaft extending rotatably into the support and having a pinion fixed thereon within the latter, and a ring cutter having an internal bearing portion and an internal gear rigidly concentric therewith and having a portion of the internal gear meshing with said pinion, the features which include a supporting member projecting rigidly a distance downward toward said work piece from the support, a bearing means fixedly incorporated in the supporting member so as to be supported thereby and also extending up into the interior of aforesaid support, and rolling bearing members located between the bearing means and the internal bearing portion of said ring cutter.

2. In a slotting tool comprising a support adapted to be located or moved above a work piece, a substantially horizontal drive shaft extending rotatably into the support from one side thereof, and having a pinion fixed thereon within the latter, and a ring cutter having an internal bearing portion and an internal gear rigidly concentric therewith about a horizontal axis and having a portion of the internal gear meshing with said pinion, the features which include a supporting member attached to and projecting rigidly a distance downward toward said work piece from the support, a bearing means fixedly incorporated in the supporting member so as to be supported thereby and also having a corresponding portion located within the interior of the aforesaid support, and rolling bearing means located between the bearing means and its corresponding portion within the support and the internal bearing portion of said ring cutter.

AUSTIN P. OWENS.

REFERENCES CITED

The following references are of record in the file of this patent:

UNITED STATES PATENTS

| Number | Name | Date |
|---|---|---|
| 1,198,646 | Maddox | Sept. 19, 1916 |
| 1,523,151 | Wilsbach | Jan. 13, 1925 |
| 1,635,723 | Miller | July 12, 1927 |
| 1,723,821 | Swan | Aug. 6, 1929 |